(12) United States Patent
Loew et al.

(10) Patent No.: US 12,573,730 B2
(45) Date of Patent: Mar. 10, 2026

(54) BATTERY MODULE COMPRISING A PLURALITY OF BATTERY CELLS AND METHOD FOR PRODUCING SUCH A BATTERY MODULE

(71) Applicant: Robert Bosch GmbH, Stuttgart (DE)

(72) Inventors: Christian Loew, Stuttgart (DE); Dominik Schaefer, Stuttgart (DE); Frank Gottwald, Weissach (DE); Ralph Glemser, Brackenheim (DE)

(73) Assignee: Robert Bosch GmbH, Stuttgart (DE)

( * ) Notice: Subject to any disclaimer, the term of this patent is extended or adjusted under 35 U.S.C. 154(b) by 607 days.

(21) Appl. No.: 17/869,928

(22) Filed: Jul. 21, 2022

(65) Prior Publication Data

US 2023/0024294 A1     Jan. 26, 2023

(30) Foreign Application Priority Data

Jul. 23, 2021     (DE) ..................... 10 2021 207 933.4

(51) Int. Cl.
  *H01M 50/583*        (2021.01)
  *H01M 10/0525*        (2010.01)
      (Continued)

(52) U.S. Cl.
  CPC ..... *H01M 50/583* (2021.01); *H01M 10/0525* (2013.01); *H01M 10/058* (2013.01);
      (Continued)

(58) Field of Classification Search
  CPC .. H01M 50/583; H01M 50/51; H01M 50/553; H01M 50/512; H01M 10/0525; H01M 10/058
  See application file for complete search history.

(56) References Cited

U.S. PATENT DOCUMENTS

2003/0108789 A1 *  6/2003  Yamakawa ......... H01M 50/588
                                                429/178
2005/0221164 A1 * 10/2005  Kawazu ................ H01M 10/42
                                                429/61
(Continued)

FOREIGN PATENT DOCUMENTS

DE        102013218668 A1    3/2015
DE        102014202394 A1    8/2015
(Continued)

OTHER PUBLICATIONS

Machine Translation of WO 2015003789A1 (Year: 2025).*

*Primary Examiner* — Matthew J Merkling
(74) *Attorney, Agent, or Firm* — Michael Best & Friedrich LLP

(57)        ABSTRACT

A battery module comprising a plurality of battery cells (2), which are each connected electrically conductively in series and/or in parallel with one another, and comprising a switching device (3), which has a first terminal (31) and a second terminal (32), wherein a first electrically conductive connecting element (41) connects the first terminal (31) of the switching device (3) electrically conductively to a first terminal (51) of a fuse element (5), and a second terminal (52) of the fuse element (5) is electrically conductively connected to a voltage tap (61) of a terminally arranged battery cell (2, 21), and a second electrically conductive connecting element (42) connects the second terminal (32) of the switching device (3) electrically conductively to a voltage tap (62) of the battery module (1).

8 Claims, 3 Drawing Sheets

(51) Int. Cl.
    *H01M 10/058*        (2010.01)
    *H01M 50/51*          (2021.01)
    *H01M 50/512*        (2021.01)
    *H01M 50/553*        (2021.01)

(52) U.S. Cl.
    CPC ......... *H01M 50/51* (2021.01); *H01M 50/512*
            (2021.01); *H01M 50/553* (2021.01); *H01M*
                            *2200/103* (2013.01)

(56)                    References Cited

U.S. PATENT DOCUMENTS

2006/0030176  A1*   2/2006  Ikeda ..................... H02G 3/088
                                                            439/76.2
2012/0183813  A1*   7/2012  Kim .................... H01M 50/204
                                                            429/7
2014/0093752  A1*   4/2014  Shen .................... B60L 3/0007
                                                            429/7
2015/0295283  A1    10/2015  Eom et al.
2016/0072118  A1*   3/2016  Park ....................... H01H 89/00
                                                            429/61
2018/0026315  A1    1/2018  Hinterberger et al.
2018/0062226  A1*   3/2018  Raiser ................ H01M 10/613
2019/0006648  A1    1/2019  Motohashi et al.

FOREIGN PATENT DOCUMENTS

DE        102018005747  A1      2/2019
EP              2930771  A1     10/2015
JP            2019186043  A      10/2019
WO        WO-2015003789  A2 *   1/2015  .......... H01M 50/262

* cited by examiner

BATTERY MODULE COMPRISING A PLURALITY OF BATTERY CELLS AND METHOD FOR PRODUCING SUCH A BATTERY MODULE

BACKGROUND OF THE INVENTION

The invention is based on a battery module comprising a plurality of battery cells. The subject matter of the present invention is also a method for producing such a battery module.

It is known from the prior art that a battery module has a plurality of individual battery cells which each have a positive voltage tap and a negative voltage tap, wherein, in order to electrically conductively connect the plurality of battery cells in series and/or in parallel with one another, the respective voltage taps are electrically conductively connected to one another and can therefore be connected together to form the battery module. Battery modules for their part are in addition connected to one another to form batteries or to form entire battery systems.

In addition, such battery modules often have switching devices such as, for example, a relay, which are intended to regulate safe isolation from the supply generally at the positive terminal of the battery module. Such switching devices therefore conduct the maximum current of the respective battery module and in principle generate a comparatively large amount of heat.

It is furthermore known from the prior art to output this heat to be output, for example, over a surface of the switching device or else a current conductor, which electrically conductively connects the switching device to a battery cell, by means of convection to ambient air of the battery module.

The prior art comprises, for example, documents US 2018/0026315 or DE 10 2013 218 668.

SUMMARY OF THE INVENTION

A battery module comprising a plurality of battery cells having the features of the invention provides the advantage that a level of safety of the battery module, for example in the event of a short circuit, is increased.

For this purpose, in accordance with the invention, a battery module comprising a plurality of battery cells is made available. The battery cells are in this case in particular in the form of lithium-ion battery cells. Furthermore, the battery cells are each connected electrically conductively in series and/or in parallel with one another. For this purpose, the battery cells can each have a first voltage tap, in particular a positive voltage tap, and a second voltage tap, in particular a negative voltage tap, which are electrically conductively connected to one another by means of cell connectors, with the result that an electrical series and/or parallel interconnection is formed.

In addition, the battery module comprises a switching device having a first terminal and having a second terminal. A first electrically conductive connecting element connects the first terminal of the switching device electrically conductively to a first terminal of a fuse element. A second terminal of the fuse element is furthermore electrically conductively connected to a voltage tap of a terminally arranged battery cell. In particular, the voltage tap of the terminally arranged battery cell is in this case a first voltage tap or positive voltage tap. A second electrically conductive connecting element connects the second terminal of the switching device electrically conductively to a voltage tap of the battery module. In particular, the voltage tap of the battery module is in this case a positive voltage tap.

By virtue of the measures listed in the dependent claims, advantageous developments and improvements of the device specified in the independent claim are possible.

At this juncture it will be mentioned that a switching device in principle serves to switch a circuit such that said circuit is either open or closed. The switching device can in this case be in the form of, for example, a semiconductor switch, which are also known as transistors, metal-oxide semiconductor field-effect transistors (or MOSFET for short) or insulated-gate bipolar transistors (or IGBT for short). Furthermore, the switching device can in this case also be, for example, in the form of a relay, which in principle is a switch operated by electric current and having in general two switch positions, and in which an electrical contact can be opened and closed, for example, by an electromagnetic force.

At this juncture it will also be mentioned that a fuse element in principle serves the purpose of providing protection from an overload or a short circuit. Fuses comprise, for example, a comparatively thin fuse wire which is designed to fuse in the case of an increased current.

It is expedient when the first electrically conductive connecting element and/or the second electrically conductive connecting element is/are accommodated in thermally conductive fashion in a receptacle of the housing of the battery module. As a result, reliable heat dissipation can be formed.

At this juncture it will be mentioned in this regard that, with such an embodiment of the battery module according to the invention, in particular also the positive voltage tap of the terminally arranged battery cell, which voltage tap experiences a comparatively high thermal load, can be subjected to heat dissipation in a reliable manner.

Overall, therefore, even in the case of comparatively high demands being placed on the battery module, reliable heat dissipation of the switching device and of the positive voltage tap of the terminally arranged battery cell can be made available, for example, to an average continuous current of 200 A or a maximum current of 600 A for 10 seconds. Therefore, a maximum temperature at the positive voltage tap of the terminally arranged battery cell or the switching device can be kept comparatively low, and in particular the life of the entire battery module can thus also be increased.

Expediently, furthermore a thermally conductive compensation material is arranged in the receptacle. At this juncture it will be mentioned that the compensation material is also known as thermal interface material (or TIM for short). In particular, the compensation material can also be designed to be electrically insulating in order to form an electrical insulation. In particular, this material can preferably be selected from an epoxy or a silicone or a polyurethane (or PU for short).

In particular, the compensation element can be accommodated in the receptacle prior to an arrangement of the first electrically conductive connecting element or the second electrically conductive connecting element. By virtue of inserting the first electrically conductive connecting element or the second electrically conductive connecting element, the compensation element can be distributed in the receptacle and thus form a reliable heat transfer. In particular, the compensation material is designed to be elastically or plastically deformable.

It is advantageous if the receptacle is arranged on a side face of the housing of the battery module. In addition, it could also be advantageous if the receptacle is formed on a base of the housing of the battery module. At this juncture it will be mentioned that a base will be understood to mean the lower side of the battery module which is arranged at the bottom during ordinary use. Correspondingly, a side face is intended to be arranged perpendicular to the lower side.

Particularly preferably, the first electrically conductive connecting element and the second electrically conductive connecting element are formed from a material selected from copper or aluminum or ceramic. This provides the advantage that particularly reliable heat dissipation can be made available owing to a comparatively high thermal conductivity.

It is particularly preferred if the housing of the battery module comprises a tempering element. For example, the battery module can, for this purpose, form a tempering room through which tempering fluid can flow. The tempering element is in this case preferably arranged on a lower side of the battery module. In addition, the tempering element can also be in the form of a tempering plate, which can be arranged in addition to the housing. In particular, the housing of the battery module and/or the tempering element can preferably be formed from aluminum. As a result, active cooling of the housing of the battery module can be formed.

It is advantageous if the receptacle is arranged directly adjacent to the tempering element. As a result, heat can be transferred particularly effectively to the tempering element. In particular, heat can thus be transferred reliably to the tempering element by means of the first electrically conductive connecting element and the second electrically conductive connecting element.

In accordance with a preferred aspect of the invention, the switching device is arranged directly adjacent to the terminally arranged battery cell.

Preferably, the battery cells are in this case in the form of prismatic battery cells. Prismatic battery cells generally have six side faces, wherein opposite side faces are each arranged substantially parallel to one another and are of substantially equal size. Side faces arranged directly adjacent to one another are in this case each arranged substantially at right angles to one another. The battery cells are in this case arranged in such a way that they are preferably arranged with their respective largest side faces adjacent to one another in a longitudinal direction of the battery module.

The switching device is in this case in particular arranged directly adjacent to a largest side face of a battery cell which is terminally arranged in the longitudinal direction. At this juncture it will also be mentioned that terminally arranged can also means terminally arranged in the electrical sense. A terminal arrangement in particular provides the advantage that a short electrically conductive connection between the first terminal of the switching device and the voltage tap of the terminal battery cell needs to be formed.

It is particularly advantageous that, with an embodiment according to the invention, in particular heat generated within the switching device during operation can be dissipated to the housing of the battery module by means of the first electrically conductive connecting element and the second electrically conductive connecting element via the respective receptacle. As a result, for example, the life of the switching device can be increased and/or the switching device can be adapted to comparatively higher demands placed on the battery module, in particular as regards the maximum current flow.

At this juncture it will be mentioned that the first terminal of the switching device and the first electrically conductive connecting element can also be formed together in one piece and that the second terminal of the switching device and the second electrically conductive connecting element can also be formed together in one piece.

Overall, an embodiment according to the invention of the battery module comprising a plurality of battery cells provides the advantage that, in the event of a short circuit between the first electrically conductive connecting element and the terminally arranged battery cell, protection is ensured even when the switching device is open. Moreover, the fuse element can also reduce heat conduction between the terminal battery cell and the switching device.

The subject matter of the present invention is also a method for producing a battery module comprising a plurality of battery cells. The battery cells are in this case in particular in the form of lithium-ion battery cells. In addition, the battery cells are each connected electrically conductively in series and/or in parallel with one another. In this case, a first electrically conductive connecting element is electrically conductively connected to a first termination of a switching device and a first terminal of a fuse element. A second terminal of the fuse element is electrically conductively connected to a voltage tap of a terminally arranged battery cell. Furthermore, a second electrically conductive connecting element is electrically conductively connected to a second terminal of the switching device and a voltage tap of the battery module. The first connecting element and/or the second connecting element can furthermore be accommodated in thermally conductive fashion in a receptacle of the housing of the battery module.

In particular, the method is a method for producing a battery module according to the invention as just described, with the result that the method according to the invention can also be developed for the advantageous developments described in connection with the battery module according to the invention.

BRIEF DESCRIPTION OF THE DRAWINGS

Exemplary embodiments of the invention are illustrated in the drawings and will be explained in more detail in the following description.

In the drawings.

DETAILED DESCRIPTION

Figure 1:
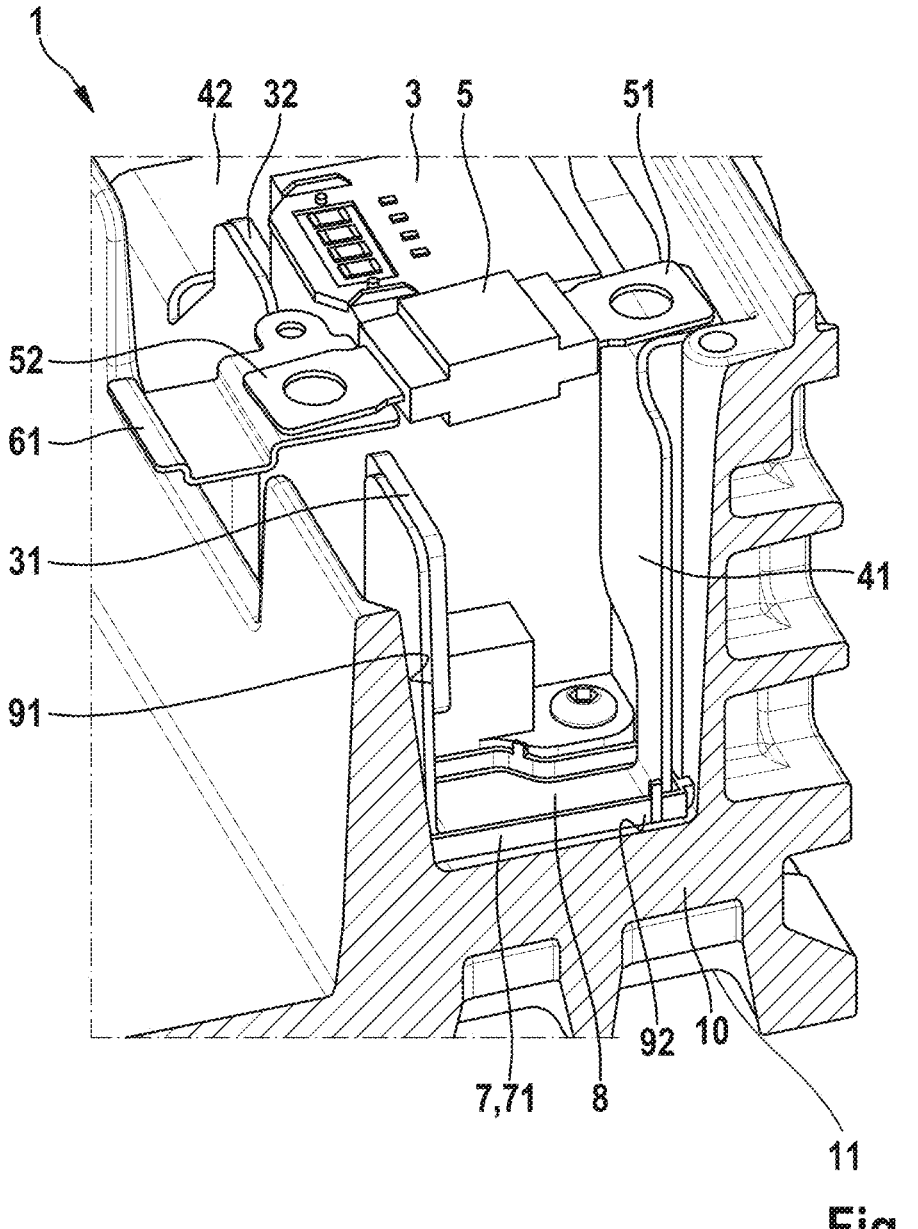
FIG. 1 shows a detail of a first embodiment according to the invention of a battery module in a perspective view.
Figure 2:
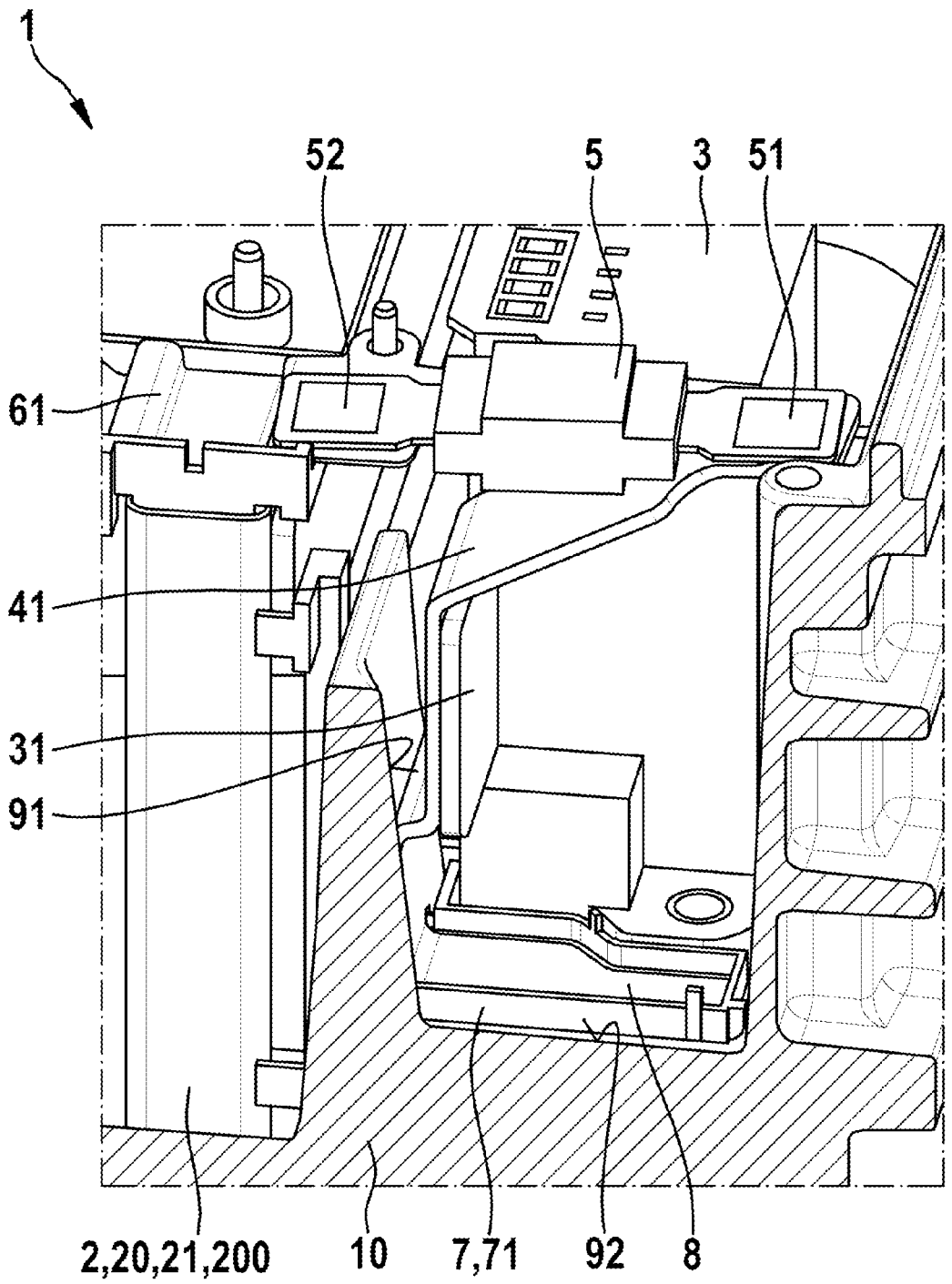
FIG. 2 shows a detail of a second embodiment according to the invention of a battery module in a perspective view.

FIG. 1 shows a detail of a first embodiment according to the invention of a battery module 1 in a perspective view, and FIG. 2 shows a detail of a second embodiment according to the invention of a battery module 1 in a perspective view. FIGS. 1 and 2 will be described together below.

The battery module 1 comprises a plurality of battery cells 2, of which one battery cell 2 is shown by way of example in FIG. 2. The battery cells 2 are in this case in particular in the form of lithium-ion battery cells 20. In addition, the battery cells 2 are in the form of prismatic battery cells 200. The battery cell 2 shown in FIG. 1 is in this case in particular a terminally arranged battery cell 21.

In this case, the battery cells 2 are each connected electrically conductively in series and/or in parallel with one another.

Furthermore, the battery module 1 comprises a switching device 3. The switching device 3 has a first terminal 31 and a second terminal 32.

In addition, the battery module 1 comprises a fuse element 5. The fuse element 5 has a first terminal 51 and a second terminal 52.

In addition, the battery module 1 comprises a first connecting element 41 and a second connecting element 42. The first connecting element 41 and the second connecting element 42 are in this case each designed to be electrically conductive. The first connecting element 41 and the second connecting element 42 are in this case formed from, for example, copper or aluminum or a ceramic.

The first connecting element 41 connects the first terminal 31 of the switching device 3 electrically conductively to the first terminal 51 of the fuse element 5. The second terminal 52 of the fuse element 5 is electrically conductively connected to a voltage tap 61 of the terminally arranged battery cell 21.

Figure 3:
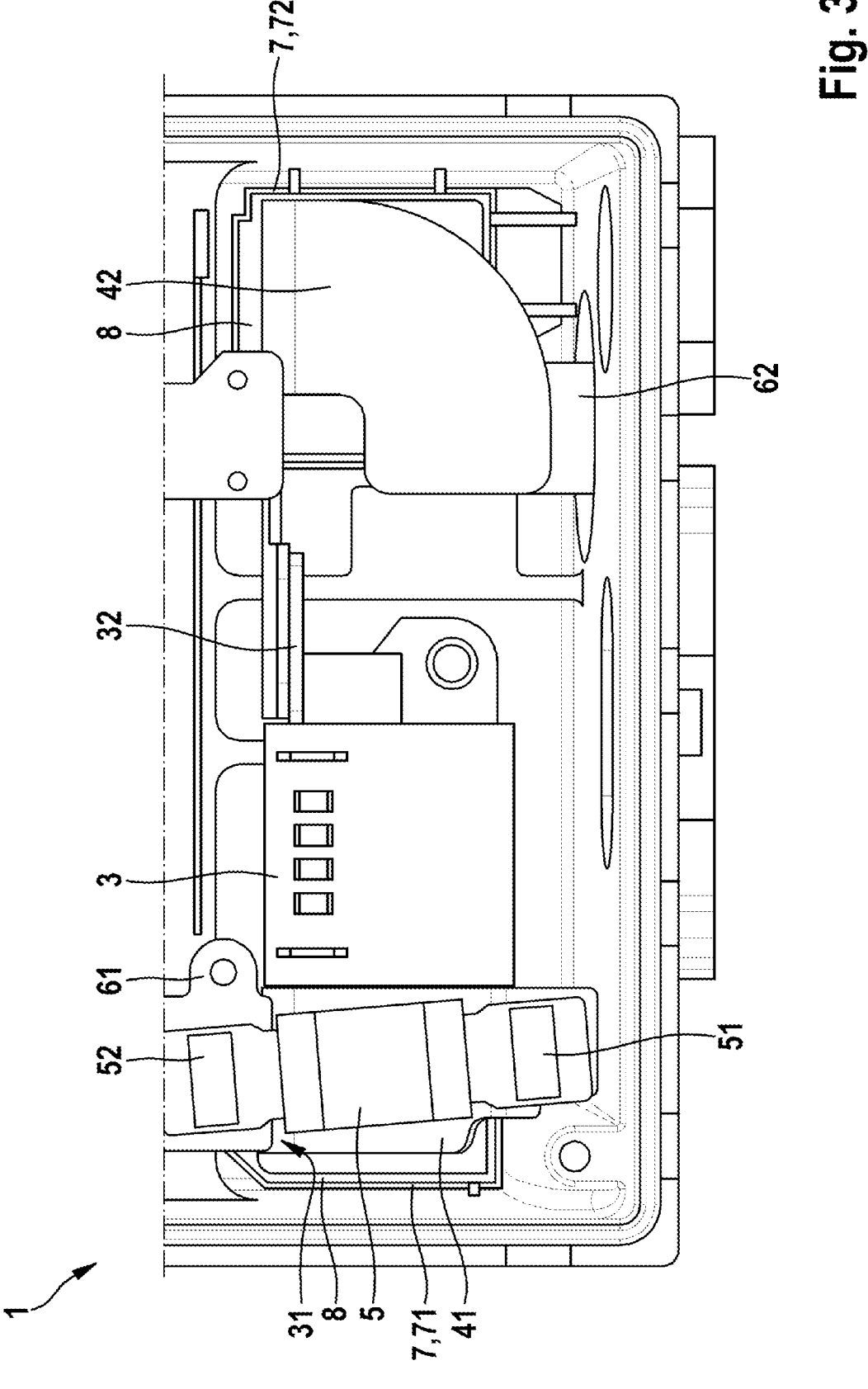
FIG. 3 shows a plan view of an embodiment according to the invention of a battery module.

The second connecting element 42 connects the second terminal 32 of the switching device 3 electrically conductively to a voltage tap 62 of the battery module 1, which can be seen from FIG. 3.

Furthermore, a housing 10 of the battery module 1 comprises receptacles 7. In particular, the battery module 1 has a first receptacle 71 and a second receptacle 72. In this case, the first connecting element 41 is accommodated in thermally conductive fashion in the first receptacle 71. Furthermore, the second connecting element 42 is accommodated in thermally conductive fashion in the second receptacle 72.

Furthermore, it can be seen that, in addition, a thermally conductive compensation material 8 is arranged in a receptacle 7.

In this case, the receptacle 7 is formed on a base 92 of the housing 10 of the battery module 1. The receptacle 7 could also be formed on a side face 91 of the housing 10 of the battery module 1.

FIG. 3 shows a plan view of an embodiment according to the invention of a battery module 1.

In this case, first the switching device 3 having the first terminal 31 and the second terminal 32 can be seen. In addition, the first electrically conductive connecting element 41 and the second electrically conductive connecting element 42 can be seen. Furthermore, the fuse element 5 having the first terminal 51 and the second terminal 52 can be seen.

At this juncture, it will once again be mentioned that the first terminal 31 of the switching device 3 is electrically conductively connected to the first electrically conductive connecting element 41, and that the first terminal 51 of the fuse element 5 is electrically conductively connected to the first electrically conductive connecting element 41. As a result, the first electrically conductive connecting element 51 connects the first terminal 31 of the switching device 3 and the first terminal 51 of the fuse element 5 electrically conductively to one another.

Furthermore, it will once again be mentioned at this juncture that the second terminal 52 of the fuse element 5 is electrically conductively connected to a voltage tap 61 of a terminally arranged battery cell 21 electrically conductively. As a result, the fuse element 5 is therefore arranged electrically between the terminally arranged battery cell 21 and the switching device 3.

In addition, at this juncture it will once again be mentioned that the second terminal 32 of the switching device 3 is electrically conductively connected to the second electrically conductive connecting element 42, and that the voltage tap 62 of the battery module 1 is electrically conductively connected to the second electrically conductive connecting element 42.

As a result, the second electrically conductive connecting element 51 connects the second terminal 32 of the switching device 3 and the voltage tap 62 of the battery module 1 electrically conductively to one another.

Furthermore, the first receptacle 71 and the second receptacle 72 can also be seen, in which the first electrically conductive connecting element 41 and the second electrically conductive connecting element 42, respectively, are accommodated. In addition, in this case the thermally conductive compensation material 8 accommodated in each case in said receptacles can be seen.

The invention claimed is:

1. A battery module comprising:
   a plurality of battery cells (2) which are connected electrically conductively in series and/or in parallel with one another,
   a switching device (3) which has a first terminal (31) and a second terminal (32),
   wherein a first electrically conductive connecting element (41) connects the first terminal (31) of the switching device (3) electrically conductively to a first terminal (51) of a fuse element (5),
   a second terminal (52) of the fuse element (5) is electrically conductively connected to a voltage tap (61) of a terminally arranged battery cell (2, 21),
   a second electrically conductive connecting element (42) connects the second terminal (32) of the switching device (3) electrically conductively to a voltage tap (62) of the battery module (1),
   a housing (10) comprising a body defining a tempering element (11) configured to create a space through which tempering fluid can flow, and the body further defining a receptacle (7) arranged near to the tempering element (11),
   wherein a first portion of the body of the housing (10) separates the receptacle (7) from the tempering element (11),
   wherein a second portion (91) of the body of the housing (10) separates the receptacle (7) from the plurality of battery cells (2).

2. The battery module according to claim 1, wherein the first electrically conductive connecting element (41) and/or the second electrically conductive connecting element (42) is/are accommodated in thermally conductive fashion in the receptacle (7, 71, 72) of the housing (10) of the battery module (1).

3. The battery module according to claim 2, wherein a thermally conductive compensation material (8) is accommodated in the receptacle (7).

4. The battery module according to claim 1, wherein the first electrically conductive connecting element (41) and the second electrically conductive connecting element (42) are formed from a material selected from copper or aluminum or ceramic.

5. The battery module according to claim 1, wherein the plurality of battery cells (2) are lithium-ion battery cells (20).

6. A method for producing a battery module comprising a plurality of battery cells (2) which are connected electrically conductively in series and/or in parallel with one another,
   wherein a first electrically conductive connecting element (41) is electrically conductively connected to a first terminal (31) of a switching device (3) and a first terminal (51) of a fuse element (5), wherein a second terminal (52) of the fuse element (5) is electrically conductively connected to a voltage tap (61) of a terminally arranged battery cell (2, 21), wherein a second electrically conductive connecting element (42) is electrically conductively connected to a second terminal (32) of the switching device (3) and a voltage tap (62) of the battery module (1), providing a housing (10) comprising a body defining a tempering element (11) configured to create a space through which tempering fluid can flow, and the body further defining a receptacle (7) arranged near to the tempering element (11), wherein a first portion of the body of the housing (10) separates the receptacle (7) from the tempering element (11), wherein a second portion (91) of the body of the housing (10) separates the receptacle (7) from the plurality of battery cells (2).

7. A method for producing a battery module according to claim 1, wherein the plurality of battery cells (2) are lithium-ion battery cells (20) which are each connected electrically conductively in series and/or in parallel with one another, wherein a first electrically conductive connecting element (41) is electrically conductively connected to a first terminal (31) of a switching device (3) and a first terminal (51) of a fuse element (5), wherein a second terminal (52) of the fuse element (5) is electrically conductively connected to a voltage tap (61) of a terminally arranged battery cell (2, 21), and wherein a second electrically conductive connecting element (42) is electrically conductively connected to a second terminal (32) of the switching device (3) and a voltage tap (62) of the battery module (1).

8. The battery module according to claim 6, wherein the first electrically conductive connecting element (41) and/or the second electrically conductive connecting element (42) is/are accommodated in thermally conductive fashion in the receptacle (7, 71, 72) of the housing (10) of the battery module (1).

* * * * *